United States Patent
Rune

(10) Patent No.: US 11,224,029 B2
(45) Date of Patent: Jan. 11, 2022

(54) CONFIGURATION OF PAGING TRANSMISSIONS FOR WIDEBAND AND NARROWBAND UES IN NR

(71) Applicant: TELEFONAKTIEBOLAGET LM ERICSSON (PUBL), Stockholm (SE)

(72) Inventor: Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 16/651,176

(22) PCT Filed: Sep. 27, 2018

(86) PCT No.: PCT/IB2018/057521
§ 371 (c)(1),
(2) Date: Mar. 26, 2020

(87) PCT Pub. No.: WO2019/064236
PCT Pub. Date: Apr. 4, 2019

(65) Prior Publication Data
US 2020/0252907 A1    Aug. 6, 2020

Related U.S. Application Data

(60) Provisional application No. 62/564,977, filed on Sep. 28, 2017.

(51) Int. Cl.
| | |
|---|---|
| H04W 68/06 | (2009.01) |
| H04W 68/00 | (2009.01) |
| H04W 68/02 | (2009.01) |
| H04W 8/24  | (2009.01) |
| H04W 56/00 | (2009.01) |

(52) U.S. Cl.
CPC .......... *H04W 68/06* (2013.01); *H04W 8/24* (2013.01); *H04W 56/0015* (2013.01); *H04W 68/005* (2013.01); *H04W 68/02* (2013.01)

(58) Field of Classification Search
CPC . H04W 68/005; H04W 68/02; H04W 68/025; H04W 68/04; H04L 5/0048; H04L 5/0051; H04L 5/0053; H04L 5/0091–0094; H04B 7/0695
See application file for complete search history.

(56) References Cited

U.S. PATENT DOCUMENTS

| | | | |
|---|---|---|---|
| 2019/0069271 A1* | 2/2019 | Reial | H04W 72/005 |
| 2019/0208501 A1* | 7/2019 | Xi | H04W 68/02 |
| 2019/0327709 A1* | 10/2019 | Li | H04W 76/11 |

(Continued)

OTHER PUBLICATIONS

Ericsson, Configuration of paging transmissions in multi-beam operation, Tdoc R2-1711369, 3GPP TSG-RAN WG2 #99bis, Prague, Czech Republic, Oct. 9-13, 2017.

(Continued)

*Primary Examiner* — Marcus Smith

(57) ABSTRACT

According to certain embodiments, a method performed by a network node is provided for configuring beamformed paging transmissions to a user equipment (UE). The method includes obtaining information identifying at least one capability of the UE and taking into account the at least one capability of the UE when configuring at least one of the at least one paging occasion and the at least one paging transmission within each paging occasion.

30 Claims, 15 Drawing Sheets

(56) References Cited

U.S. PATENT DOCUMENTS

| | | | | |
|---|---|---|---|---|
| 2020/0029297 | A1* | 1/2020 | Baek | H04W 68/005 |
| 2020/0267687 | A1* | 8/2020 | Harada | H04W 68/00 |
| 2020/0404617 | A1* | 12/2020 | Murray | H04W 68/02 |
| 2021/0153162 | A1* | 5/2021 | Chen | H04W 56/001 |

OTHER PUBLICATIONS

Xiaomi Communications, Considerations on paging design, R1-1703230, 3GPP TSG RAN WG1 Meeting #88, Athens, Greece, Feb. 13-17, 2017.

* cited by examiner

FIGURE 1

CONFIGURATION OF PAGING TRANSMISSIONS FOR WIDEBAND AND NARROWBAND UES IN NR

This application is a 371 of International Application No. PCT/IB2018/057521, filed Sep. 27, 2018, which claims the benefit of U.S. Application No. 62/564,977, filed Sep. 28, 2017, the disclosures of which are fully incorporated herein by reference.

BACKGROUND

An important property of the coming 5G system (e.g. NR) is the usage of high carrier frequencies such as, for example, in the range of 6-100 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency. For example, the link budget would be worse for the same link distance even in a free space scenario if omnidirectional receive and transmit antennas are used. This motivates the usage of beamforming to compensate for the loss of link budget in high frequency spectrum. This is particularly important when communicating with user equipment (UE) with poor receivers such as, for example, low cost/low complexity UEs. Other means for improving the link budget include repetition of the transmissions to allow wide beam or omnidirectional transmission or use of Single Frequency Network (SFN) transmission from multiple TRPs in the same or different cells.

Due to the above described properties, in the high frequency bands, many downlink signals, such as synchronization signals, system information, and paging, which need to cover a certain area such as a cell rather than targeting a single UE with known location/direction are expected to be transmitted using beam sweeping. For example, the signal may be transmitted in one beam at a time, sequentially changing the direction and coverage area of the beam until the entire intended coverage area, e.g. the cell, has been covered by the transmission.

The signals in NR which correspond to the primary synchronization signal (PSS), secondary synchronization signal (SSS) and master information block/physical broadcast channel (MIB/PBCH) in LTE, are put together in an entity/structure denoted synchronization signal (SS) Block. In high frequencies, SS Blocks will be transmitted periodically using beam sweeping. Multiple such beamformed SS Block transmissions are grouped into a SS Burst and one or more SS Bursts constitute a SS Burst Set, where the SS Burst Set constitutes a full beam sweep of SS Block transmissions.

In order to support narrowband UEs in the network, the SS Block transmissions are limited to a bandwidth no greater than the minimum reception bandwidth required for a narrowband capable UE, which may also be referred to as a narrowband (NB) UE (or "NB UE"). A NB UE is a UE which only supports a limited bandwidth, according to standard specifications. The purpose of using such limitations is to enable simpler and hence cheaper UEs for certain application, such as sensor and Internet of Things (IoT) devices. Other UEs may in this document be referred to as "wideband UEs" (or "WB UEs"), "regular UEs" or "non-narrowband UEs" (or "non-NB UEs"), representing a UE capable of receiving a wider bandwidth than a narrowband UE such as, for example, the full carrier bandwidth.

SS Block transmissions are configured differently depending on the carrier frequency and the subcarrier spacing (SCS), but in all cases a full SS Burst Set transmission is confined to a 5 ms window. The specified maximum number of SS Blocks in a SS Burst Set, i.e. the maximum number of beams used for transmission of SS Blocks, increases with the carrier frequency. A SS Block spans 4 orthogonal frequency division multiplex (OFDM) symbols and two SS Blocks are transmitted in one "slot" consisting of 14 symbols. FIG. 1 illustrates an example SS Block transmission configuration in slots for the subcarrier spacings 15, 30, 120 and 240 kHz. FIG. 2 illustrates an example mapping of SS Block transmission to slots in a 5 ms window for subcarrier spacings 120 and 240 kHz.

Paging is an essential function in a mobile telecommunications system. It is used to let the network contact a UE, primarily in order to transmit downlink data to the UE, once the UE has responded to the page. Paging can also be used to inform UEs of updates of the system information in a cell. It can also be used for informing UEs of an ongoing public warning such as Earthquake and Tsunami Warning System (ETWS).

In LTE, a UE in radio resource control idle (RRC_IDLE) state camps on a cell and, while camping, monitors the paging channel associated with that cell. The UE is configured to monitor repeatedly occurring paging occasions and may reside in a discontinuous reception (DRX) sleep mode in between the paging occasions. When the UE is paged at such a paging occasion, the paging is indicated on the physical downlink control channel (PDCCH) in the form of a downlink (DL) scheduling allocation addressed to the Paging Radio Network Temporary Identifier (P-RNTI), which is shared by all UEs. This DL scheduling allocation indicates the DL transmission resources on the physical downlink shared channel (PDSCH), where the actual paging message is transmitted. A UE in RRC_IDLE state, which receives a DL scheduling allocation addressed to the P-RNTI at one of the UE's paging occasions, receives and reads the paging message from the allocated DL transmission resources to find out whether the paging message is intended for the UE. The UE(s) that is(are) subject to the paging is(are) indicated in the paging message through one or more UE paging identifiers such as, for example, System Architecture Evolution Temporary Mobile Subscriber Identity (S-TMSI) or International Mobile Subscriber Identity (IMSI), wherein each UE paging identifier is include in a paging record. Up to sixteen UEs may be addressed. As such, there may be up to sixteen paging records in one paging message.

As mentioned above, in NR, paging has to be transmitted using beamforming transmission on high carrier frequencies such as, for example, above 6 GHz. Thus, beam sweeping may be used to cover an entire cell with the page. To support beam sweeping of paging transmissions, a paging occasion (PO) in NR can consist of multiple timeslots to accommodate all the paging transmissions of the beam sweep. This is configured in the system information.

In NR, paging can be used for a UE in either RRC_IDLE state or radio resource control inactive (RRC_INACTIVE) state. In the former case, the paging is initiated by the core network. In the latter case, the paging is initiated by the random access network (RAN), which may include an anchor gNB where the UE's RAN context is stored.

It may be noted that RRC_Inactive state is a state that does not exist in LTE, but which is introduced for NR. In this state, the core network still regards the UE as connected and the UE's RAN context is maintained in the anchor gNB and the RAN-core network (RAN-CN) connection is maintained between the anchor gNB and the core network. In this state, the UE can move around in a random access network notification area (RNA) without informing the network of the UE's whereabouts. But, as soon as the UE leaves the UE's configured RNA, the UE informs the network.

There are advantages, for example, in terms of resource efficiency of placing POs in conjunction with SS Block transmissions in NR. However, wideband UEs and narrowband UEs have different prerequisites for receiving paging transmissions in conjunction with SS Block transmissions. Solutions for taking these differences into account are needed.

SUMMARY

To address the foregoing problems with existing solutions, disclosed is systems and methods for configuring paging transmissions for wideband and narrowband user equipments (UEs).

According to certain embodiments, a method performed by a network node is provided for configuring beamformed paging transmissions to a user equipment (UE). The method includes obtaining information identifying at least one capability of the UE and taking into account the at least one capability of the UE when configuring at least one of the at least one paging occasion and the at least one_paging transmission within each paging occasion.

According to certain embodiments, a network node is provided for configuring beamformed paging transmissions to a UE. The network node includes processing circuitry configured to obtain information identifying at least one capability of the UE and take into account the at least one capability of the UE when configuring at least one of the at least one paging occasion and the at least one_paging transmission within each paging occasion.

According to certain embodiments, a method by a UE is provided for receiving beamformed paging transmissions. The method includes transmitting, to a network node, information identifying a capability of the UE and receiving, from the network node, configuration information for at least one paging occasion and at least one paging transmission within each paging occasion, the configuration information based on the at least one capability of the UE.

According to certain embodiments, a UE is provided for receiving beamformed paging transmissions. The UE includes processing circuitry configured to transmit, to a network node, information identifying a capability of the UE and receive, from the network node, configuration information for at least one paging occasion and at least one paging transmission within each paging occasion, the configuration information based on the at least one capability of the UE.

Certain embodiments may provide one or more of the following technical advantage(s). For example, a technical advantage may be that certain embodiments provide a paging solution in which the paging transmissions are frequency multiplexed with the SS Block transmissions, which is an efficient solution in terms of sweep duration and resource utilization for the network itself and for each wideband capable UE in the network. As another example, a technical advantage may be that certain embodiments enable both wideband capable UEs and narrowband capable UEs to perform primary synchronization signal (PSS)/secondary synchronization signal (SSS) synchronization, channel quality measurements and page monitoring in a single wake-up period which will save energy for the UE. As still another example, a technical advantage may be that certain embodiments may enable efficient paging of both wideband UEs and narrowband UEs on high carrier frequencies where beam sweeping is used for delivery of synchronization signal (SS) Blocks and paging.

BRIEF DESCRIPTION OF THE DRAWINGS

For a more complete understanding of the disclosed embodiments and their features and advantages, reference is now made to the following description, taken in conjunction with the accompanying drawings, in which:

FIG. 1 illustrates an example SS Block transmission configuration in slots for the subcarrier spacings 15, 30, 120 and 240 kHz;

DETAILED DESCRIPTION

Figure 2:
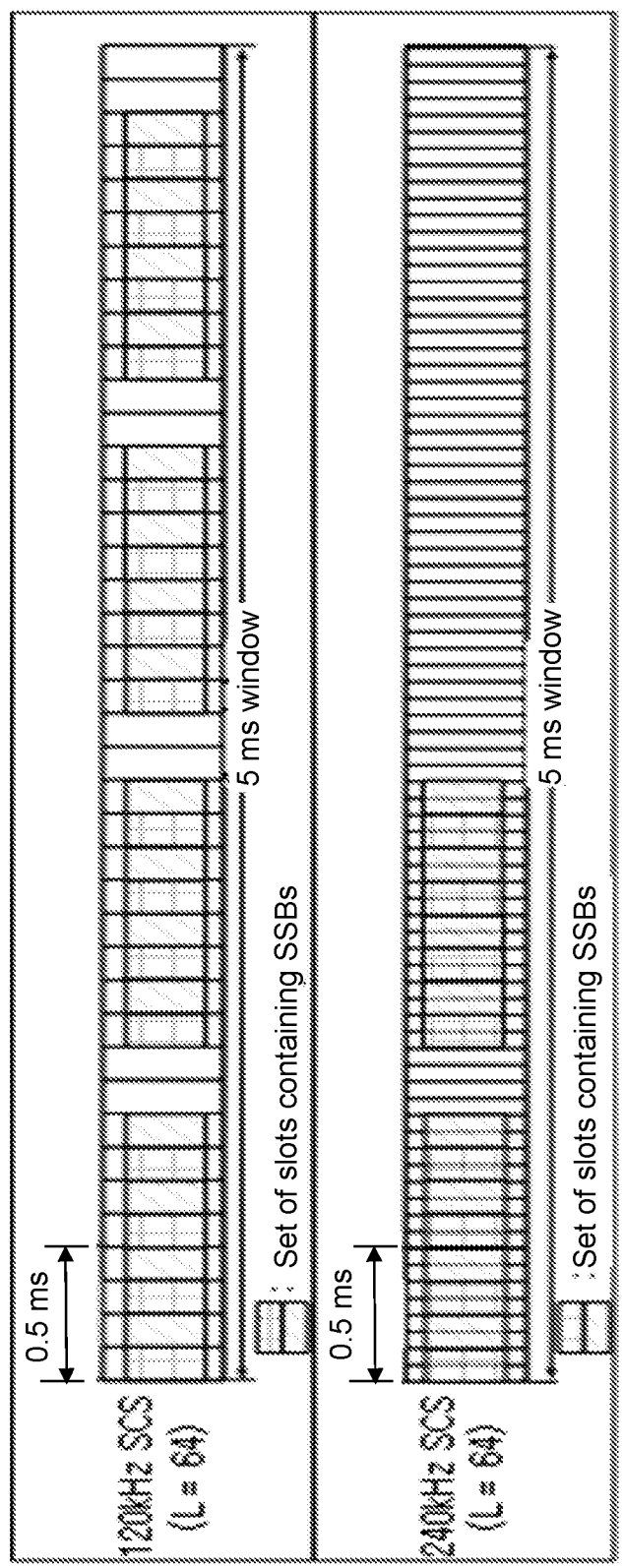
FIG. 2 illustrates an example mapping of SS Block transmission to slots in a 5 ms window for subcarrier spacings 120 and 240 kH.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain aspects of the present disclosure and their embodiments may provide solutions to the challenges described above. For example, certain embodiments may let a paging occasion (PO) cover a synchronization signal (SS) Block beam sweep, i.e. a SS Burst Set. Additionally, certain embodiments may configure paging messages to be transmitted frequency multiplexed with SS Block transmissions for wideband UEs. By contrast, paging messages for narrowband UEs may be transmitted time multiplexed with SS Block transmissions. Various ways to achieve this time multiplexing are also disclosed, as well as ways to handle this in the PO algorithm.

As mentioned above, there are advantages of placing POs in conjunction with SS Block transmissions, especially in high carrier frequencies where the SS Block transmissions as well as paging have to be conveyed using beam sweeping. In the absence of ever-present reference signal transmissions (as the cell-specific reference signal (CRS) in LTE), the UE may instead rely on the primary synchronization signal (PSS)/secondary synchronization signal (SSS) in the SS Block to maintain synchronization and perform cell suitability measurements in RRC_IDLE and RRC_INACTIVE state such as for potential cell re-selection. Being able to maintain synchronization, perform cell quality measurements, and monitor paging in a single wakeup occasion is energy efficient for a UE in RRC_IDLE or RRC_INACTIVE state.

Still, it is conceivable that POs may be located separate from PSS/SSS transmissions and then the page transmission may possibly include its own synchronization and demodulation reference signal (DMRS) components.

When analog downlink transmission (DL TX) beamforming is used in the gNB, the gNB can only transmit in one direction at a time. From this, it may be concluded that when performing an SS Block beam sweep, for each SS Block beam the gNB transmits, the part of the bandwidth that is not occupied by the SS Block (which is likely to be the lion part in most scenarios) will be wasted unless the gNB has something else to transmit in the same direction at the same time (i.e. in the same timeslots/OFDM symbols).

Suitable for such transmissions are other signals which are conveyed using beam sweeping. Thus, one way of utilizing this otherwise wasted bandwidth could be to use it for page transmissions. Transmitting paging messages frequency multiplexed with SS Block transmissions is favorable from a radio resource efficiency perspective.

On the other hand, NB UEs may not be able to receive frequency multiplexed SS Block transmissions and paging message transmissions due to their bandwidth limitation. Specifically, a NB UE can monitor any NB part of the carrier bandwidth and hence it would also be possible to let it monitor for paging messages frequency multiplexed with SS Block transmissions. However, the NB UE would then instead not be able to receive the SS Block transmissions and would thus have to wake up twice during a DRX cycle: once to receive the SS Block (or at least the PSS/SSS) to maintain synchronization and perform channel quality measurements and once to monitor the paging channel. Alternatively, the paging channel transmissions frequency multiplexed with SS Block transmissions could be self-contained with integrated synchronization and DMRS components (which may also potentially be used if POs are allowed to be located (significantly) separate from SS Block transmission occasions).

NB UEs and WB UEs have different requirements and different ability to utilize the spectrum and the potential flexibility in the configuration of the paging channel. The paging channel configuration, in terms of how paging is transmitted within a PO, also affects the radio resource efficiency.

According to certain embodiments, the network could provide two different paging channel configurations of how paging is transmitted. The first paging channel configuration may be for NB UEs and the second paging channel configuration may be for WB UEs. Optionally, the paging channel for the NB UEs could be used also for WB UEs, but not the other way around. For WB UEs, the paging channel could utilize larger bandwidth than for NB UEs.

According to certain embodiments, one way to deal with the different abilities of WB UEs and NB UEs to receive paging transmissions in conjunction with SS Block transmissions is to frequency multiplex the paging transmissions with SS Block transmissions for WB UEs, while paging transmissions targeting NB UEs are time multiplexed with the SS Block transmissions. To enable this for a WB UE, the utilized paging occasion should span (e.g. comprise the timeslots or slots of) the entire SS Block beam sweep, i.e. the entire SS Burst Set.

Also for a NB UE being paged (in conjunction with SS Block transmissions) with paging transmissions time multiplexed with SS Block transmissions, the utilized PO may span the entire SS Block beam sweep, i.e. the entire SS Burst Set. However, since the last paging transmission, or one or more of the last paging transmissions, would be transmitted after the last SS Block transmission, the PO would have to be extended beyond the SS Burst Set to accommodate the last paging transmission(s). Alternatively, the PO could be extended at the beginning to allow one or more paging transmissions to be transmitted before the first SS Block transmission. This would, however, be a less preferred solution, since it would require that the UE receives the first paging transmission(s) before it has received the synchronization signals PSS/SSS. Yet another alternative would be to let the PO span exactly the time window needed for the paging transmissions, but since this would cause the UE to miss (the possibility to receive) one PSS/SSS transmission, this alternative has the same issue as when one or more paging transmissions begin before the first SS Block transmission. However, the UE could compensate for this itself by making sure that it wakes up from its DRX sleep mode in time for reception of the first SS Block transmission (i.e. slightly before the actual start of the PO. Finally, when paging a NB UE in conjunction with SS Block transmissions, another alternative could be that the PO for a NB UE is located right after the SS Block beam sweep, i.e. right after the SS Burst Set. The time multiplexing would then be that the paging is transmitted using a beam sweep right after the SS Block beam sweep.

Figure 1:
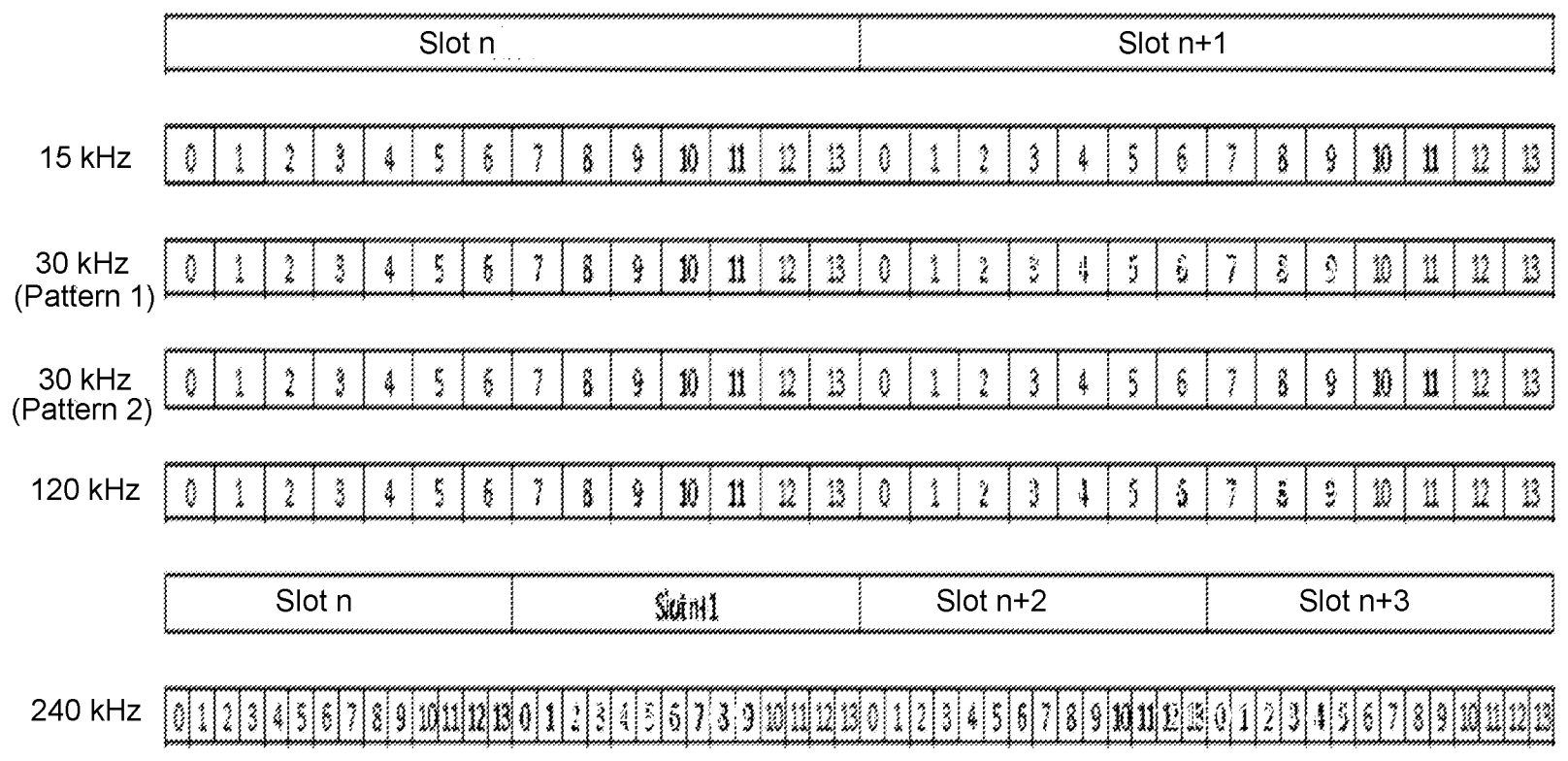

There are different ways paging transmissions could be time multiplexed with SS Block transmissions. According to certain embodiments, one way is the already mentioned alternative to transmit the paging in a beam sweep right after the SS Block beam sweep (i.e. the full SS Block beam sweep is followed by a full paging beam sweep). According to certain other embodiments, another way is to squeeze in the paging transmissions between the SS Block transmissions. Depending on the configuration of the SS Block transmissions in a SS Burst Set, which according to FIG. 1 and FIG. 2 depends on the subcarrier spacing, one or more paging transmission(s) could be transmitted as follows:

after each SS Block transmission,
after every second SS Block transmission,
after every fourth SS Block transmission, or
after every SS Burst.

However, other time multiplexing configurations such as, for example, mixes of the above listed configurations are also conceivable.

Note that paging transmissions frequency multiplexed with SS Block transmissions for WB UEs and paging transmissions time multiplexed with SS Block transmissions for NB UEs may be transmitted in conjunction with the same SS Block transmissions, thus potentially using the same paging occasion.

According to certain embodiments, when paging is transmitted in conjunction with SS Block transmissions, the same POs could potentially be configured for WB UEs and NB UEs. However, according to a particular embodiment, it may be preferable that the PO for a NB UE is slightly extended to accommodate one or more paging transmission(s) after the SS Block beam sweep, i.e. after the SS Burst Set. Alternatively, in another particular embodiment, the PO for a NB UE may be shifted to occur after the SS Block beam sweep, i.e. after the SS Burst Set, to cover a full paging transmission beam sweep being transmitted after the full SS Block beam sweep, i.e. after the entire SS Burst Set.

Thus, to support such differences in the POs for WB UEs and NB UEs different PO algorithms could be configured, or standardized, for WB UEs and NB UEs, according to a particular embodiment. Alternatively, in another particular embodiment, the same PO algorithm could be used for both WB UEs and NB UEs, but with the additional rule that if the UE is a NB UE, it should extend the PO to accommodate one or more paging transmission(s) after the SS Block beam sweep, i.e. after the SS Burst Set, or (when the PO coincides (or overlaps) with a SS Block beam sweep) shift the PO to occur right after the SS Block beam sweep, i.e. after the SS Burst Set (depending on which alternative that is used for time multiplexing of paging transmission for NB UEs).

According to certain embodiments, the paging transmission could have the form of a full paging message or it could be a paging indication indicating that a paging message may be received on other time/frequency resources. In other embodiments, a hybrid approach is also conceivable, where a partial paging message is transmitted as previously described while the remaining part of the paging message is received on other time/frequency resources.

According to certain embodiments, the instruction to a gNB to page a UE (in LTE referred to as an S1AP Paging message) should include an indication of whether the UE (or UEs) to be paged is/are wideband capable or narrowband capable. Note that such an instruction message may include instructions to page one or more WB UE(s), or one or more NB UE(s), or a mixture of both WB UE(s) and NB UE(s). For a UE in RRC_IDLE state, such an instruction message (which in LTE is referred to as an S1AP Paging message) is transmitted from the core network to the gNB. For a UE in RRC_INACTIVE state, the instruction message may instead be transmitted from another gNB such as, for example, the anchor gNB where the UE's RAN context is stored (possibly delivered via one or more other gNB(s) (or other RAN node)). The anchor gNB in has in turn received the information about the UE capabilities when the UE context was established in the anchor gNB (e.g. in a message corresponding to the Initial Context Setup Request S1AP message in LTE).

According to a particular embodiment, it may also be an alternative that the anchor gNB triggers/requests the core network to transmit the paging instruction message to the gNB(s) that will be involved in the RAN initiated paging. Note that for RAN initiated paging of a UE in RRC_INACTIVE state, the gNB initiating/triggering the paging procedure, e.g. the anchor gNB where the UE's RAN context is stored, may not have to receive any paging instruction message, since it is inherently aware of the content of the paging instruction message anyway (unless the core network could add information e.g. about UE specific DRX cycles in the alternative where the anchor gNB triggers/request the core network to transmit the paging instruction message).

The information about the UE's bandwidth capabilities such as whether the UE is wideband capable or narrowband capable originates from the UE (at least this is the case in LTE and may be the same in NR). According to certain embodiments, the UE's bandwidth capabilities may be transferred to the network in conjunction with the Attach procedure and may be updated at any time later. The UE's bandwidth capabilities is thereafter stored in the core network as long as the UE remains attached to the network. For every new gNB (or eNB in LTE) the UE connects to, the UE's capabilities are transferred from the core network to the gNB. Hence, an anchor gNB is aware of this property of the UE, but other gNBs in the RAN are not. Therefore, gNBs taking part in the paging of a UE (except the anchor gNB in the case of RAN initiated paging) have to receive this information with the instruction to page the UE.

Figure 3:
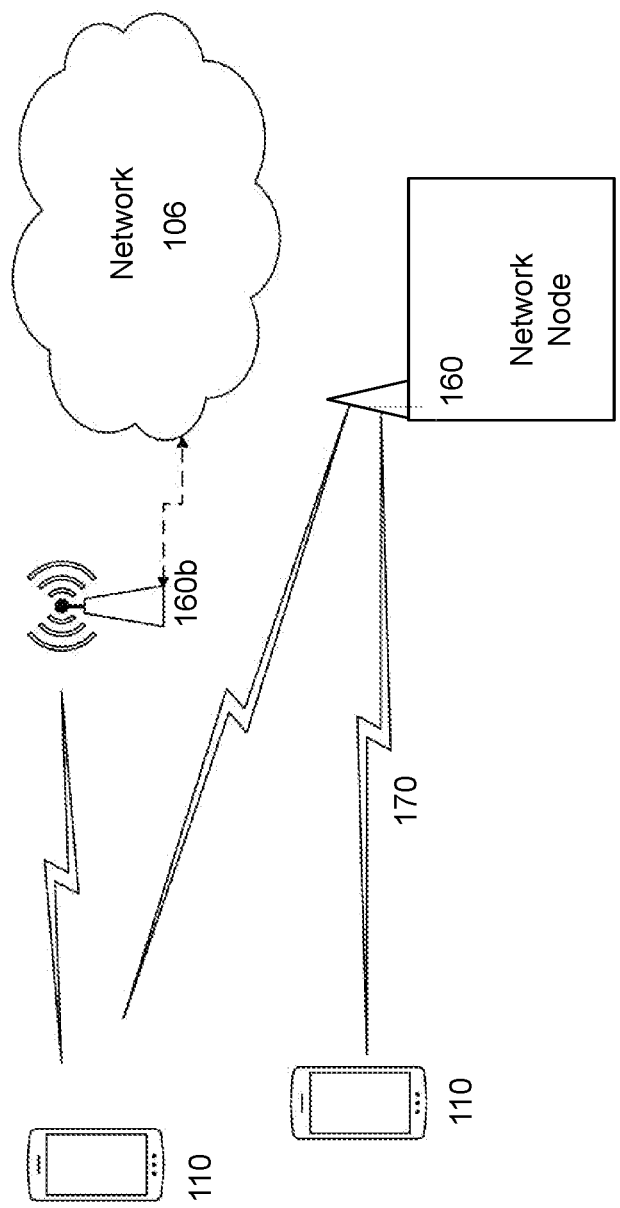
FIG. 3 illustrates an example wireless network, according to certain embodiments.

FIG. 3 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
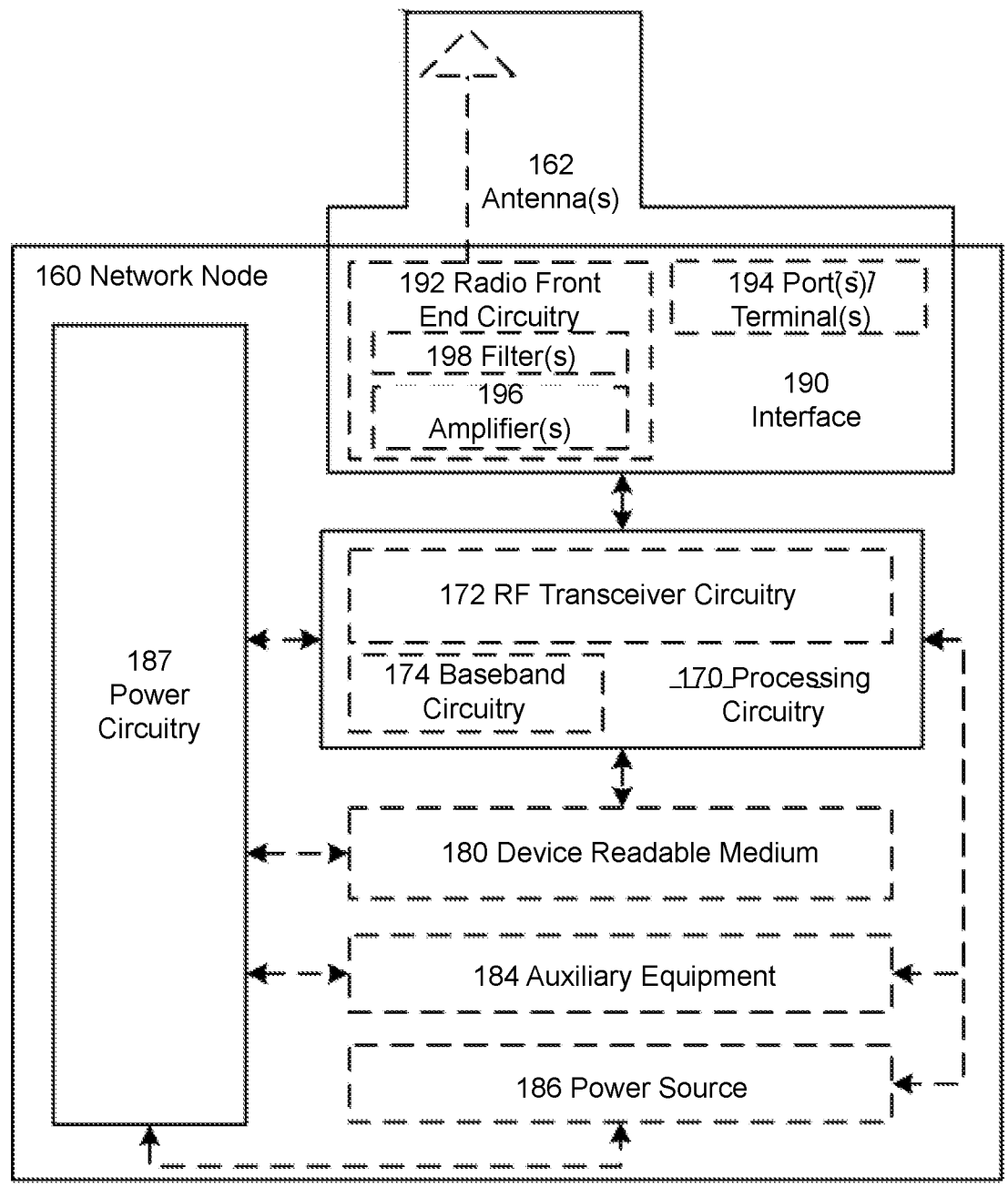
FIG. 4 illustrate an example network node, according to certain embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
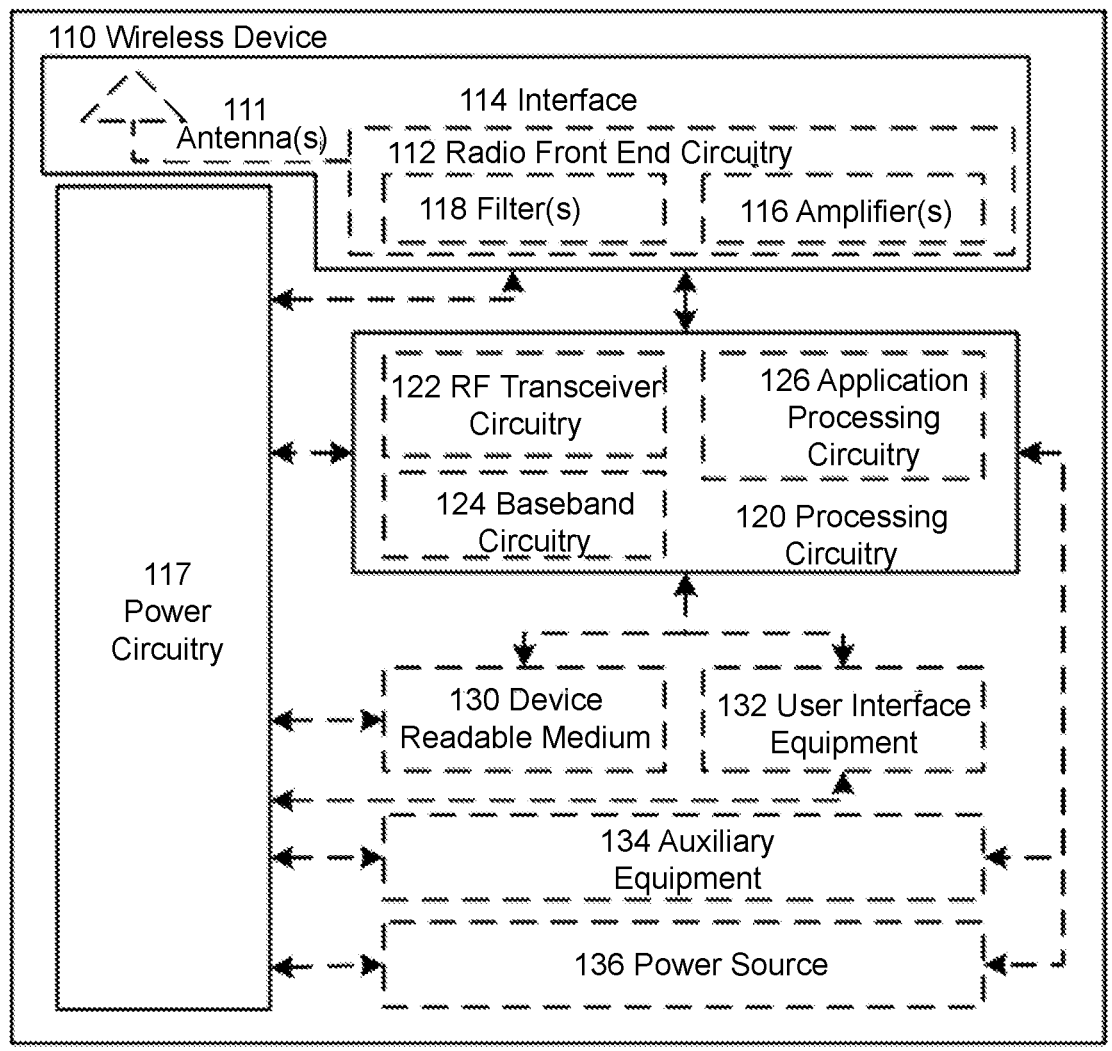
FIG. 5 illustrates an example wireless device, according to certain embodiments.

FIG. 5 illustrates an example wireless device (WD) 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 6:
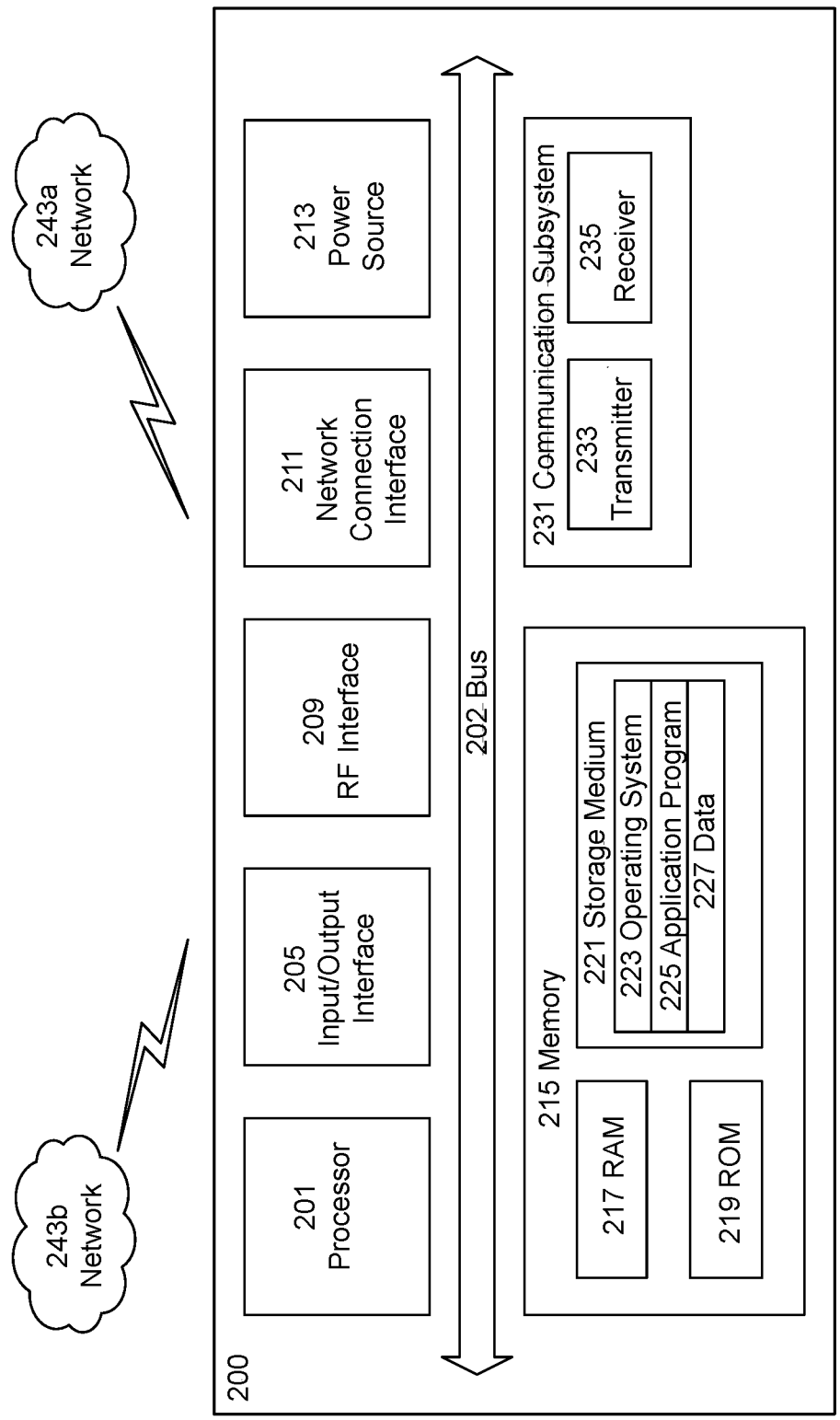
FIG. 6 illustrates an example user equipment (UE), according to certain embodiments.

FIG. 6 illustrates an example user Equipment (UE), according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.200, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
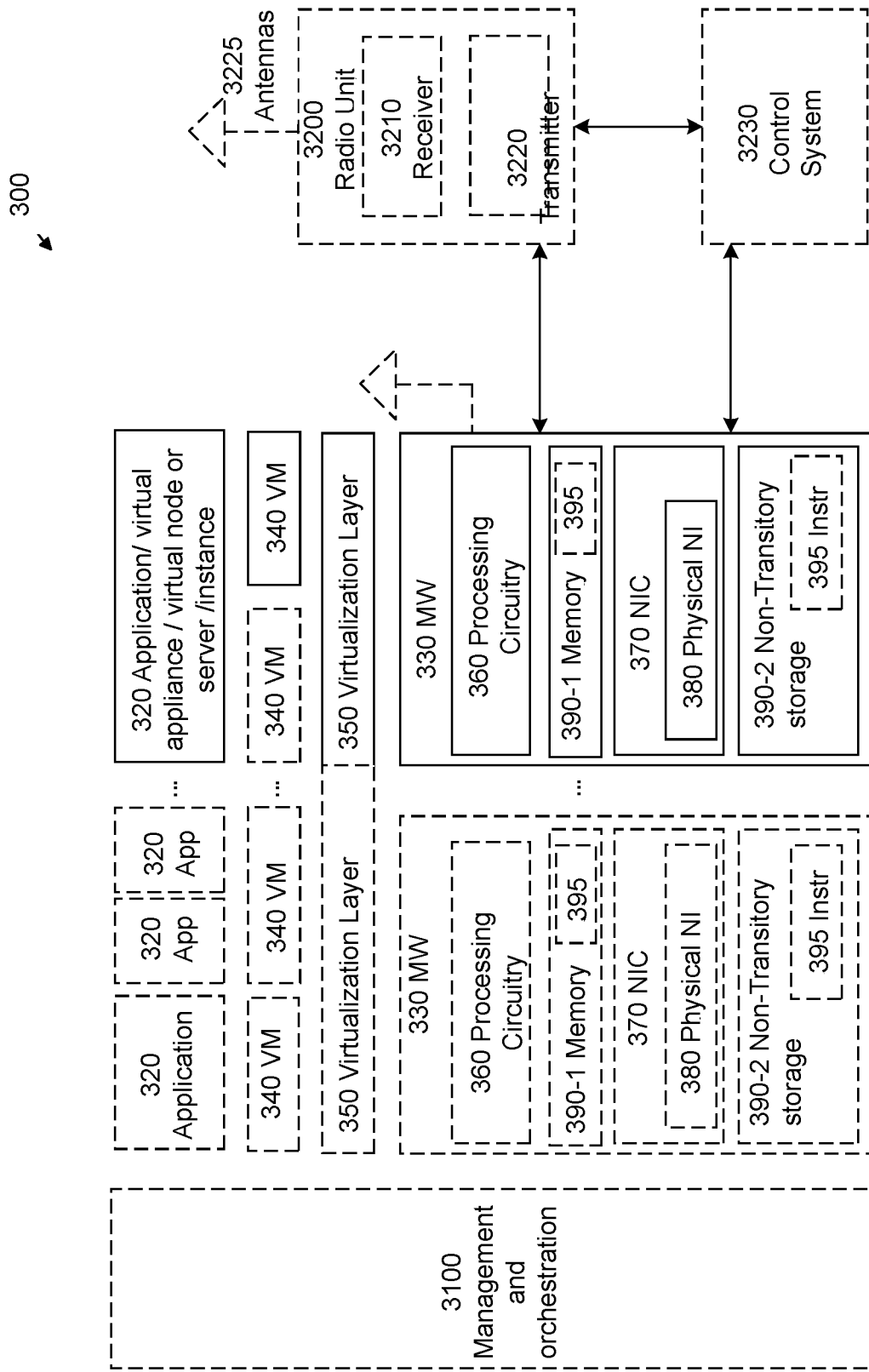
FIG. 7 illustrates a virtualization environment in which functions implemented by some embodiments may be virtualized, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
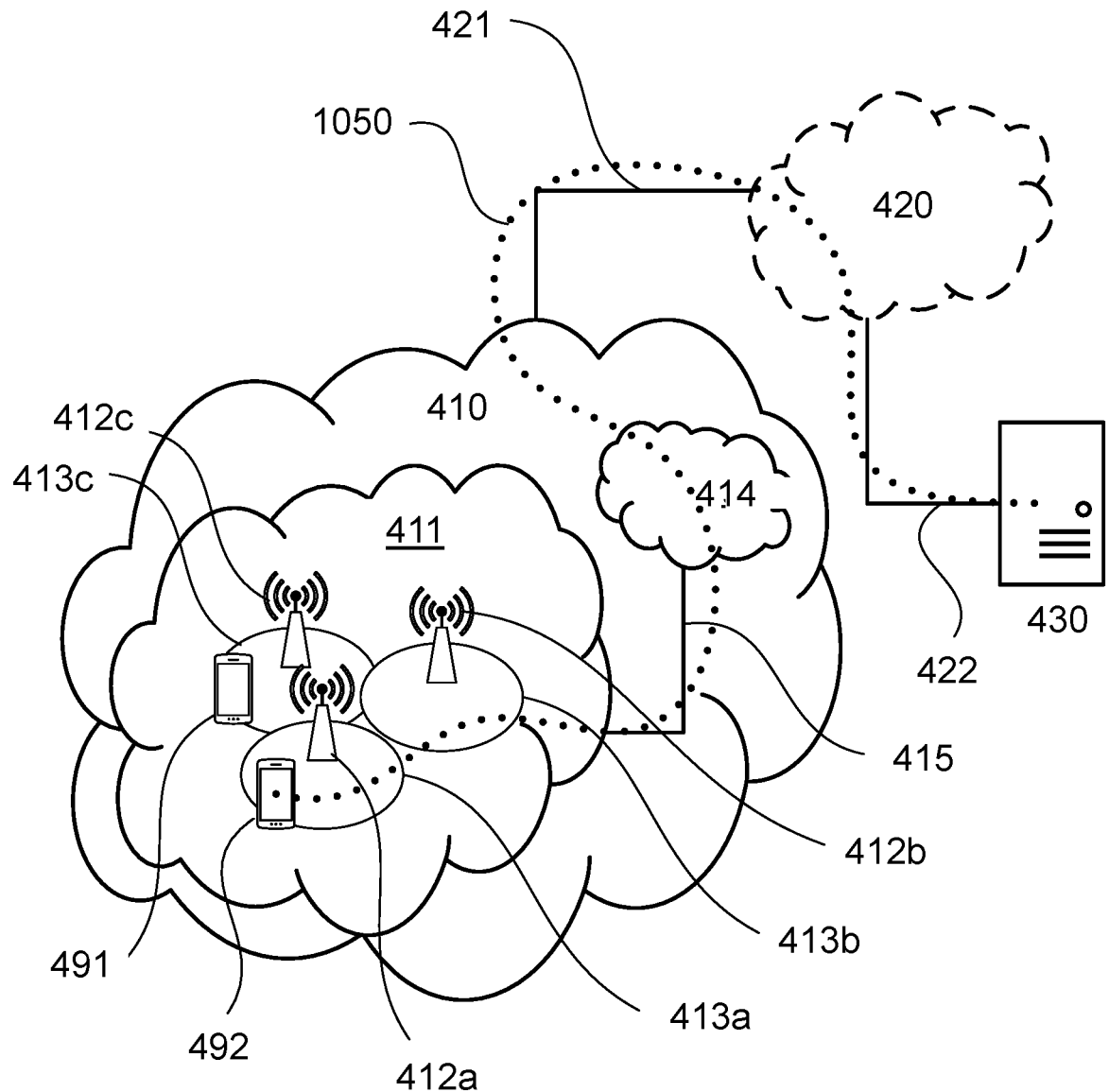
FIG. 8 illustrates a telecommunication network connected via an intermediate network to a host computer, according to certain embodiments.

FIG. 8 illustrates a telecommunication network connected via an intermediate network to a host computer, according to certain embodiments. With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 9:
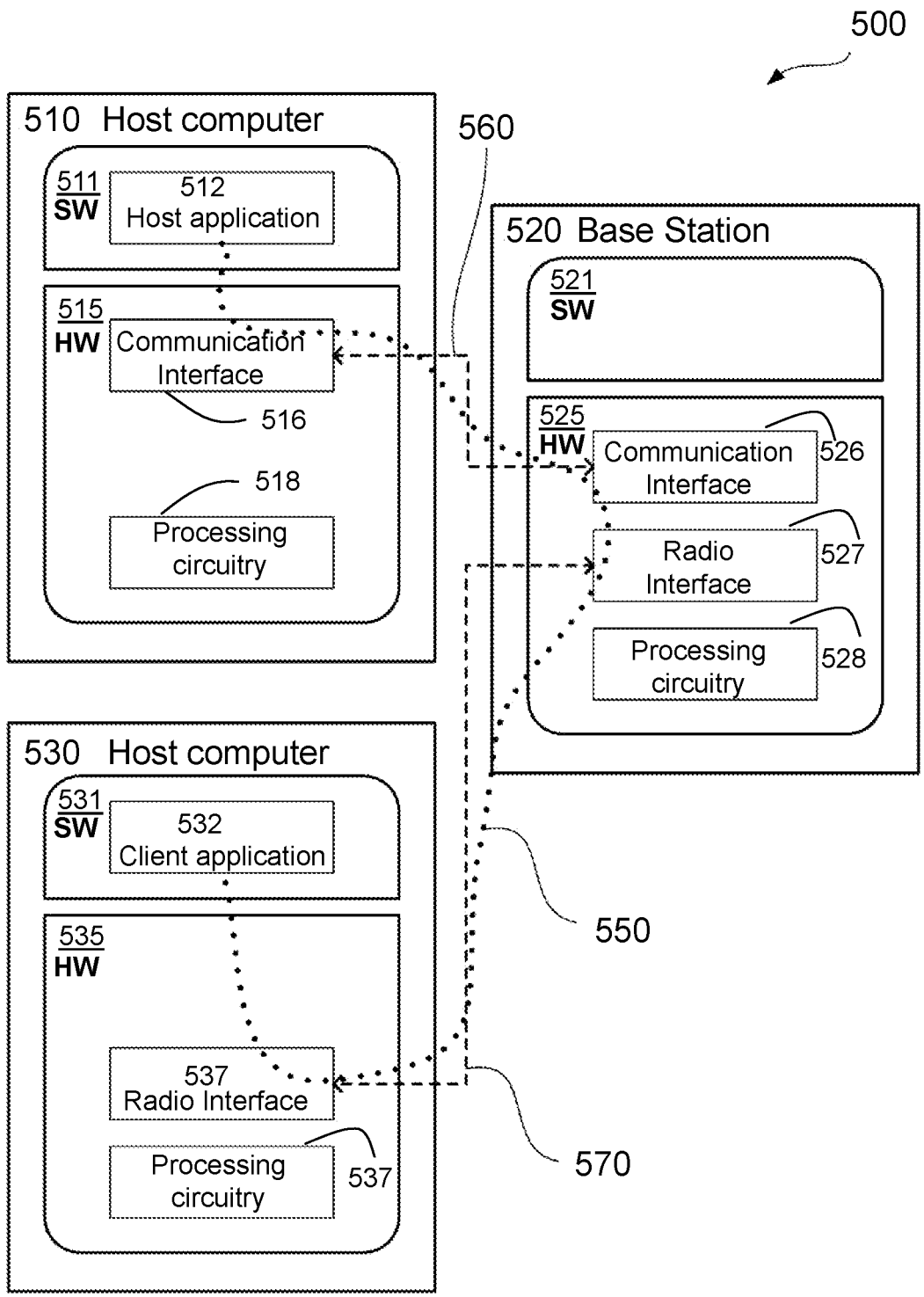
FIG. 9 illustrates a host computer communicating via a base station with a user equipment over a partially wireless connection, according to certain embodiments.

FIG. 9 illustrates a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the paging transmissions and thereby provide benefits such as faster synchronization and reduced battery consumption.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 10, 11:
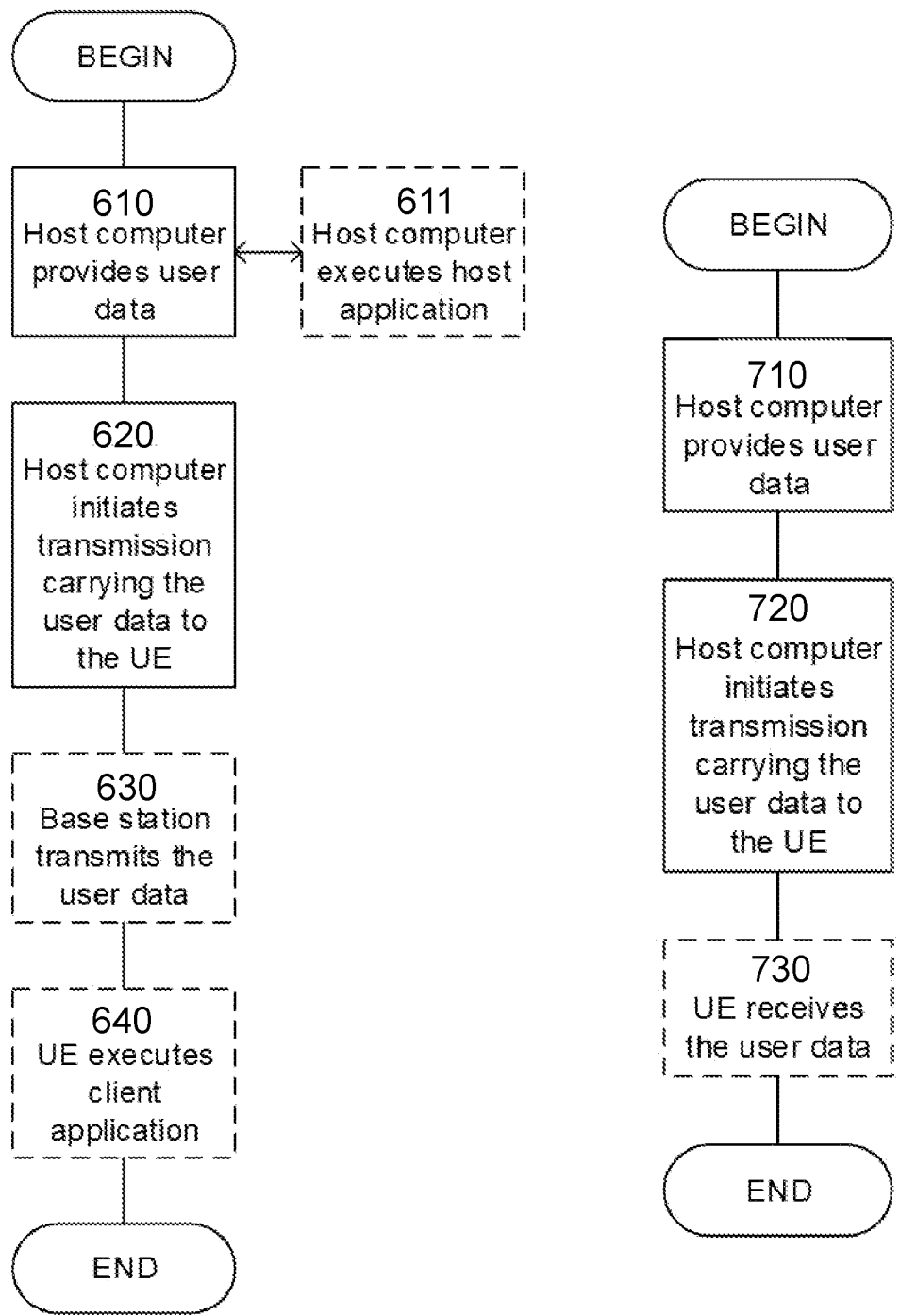
FIG. 10 illustrates a method implemented in a communication system, according to certain embodiments.
FIG. 11 illustrates a method implemented in a communication system, according to certain embodiments.

FIG. 10 is a flowchart illustrating a method implemented in a communication system, according to certain embodiments. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 11 is a flowchart illustrating a method implemented in a communication system, according to certain embodiments. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 12, 13:
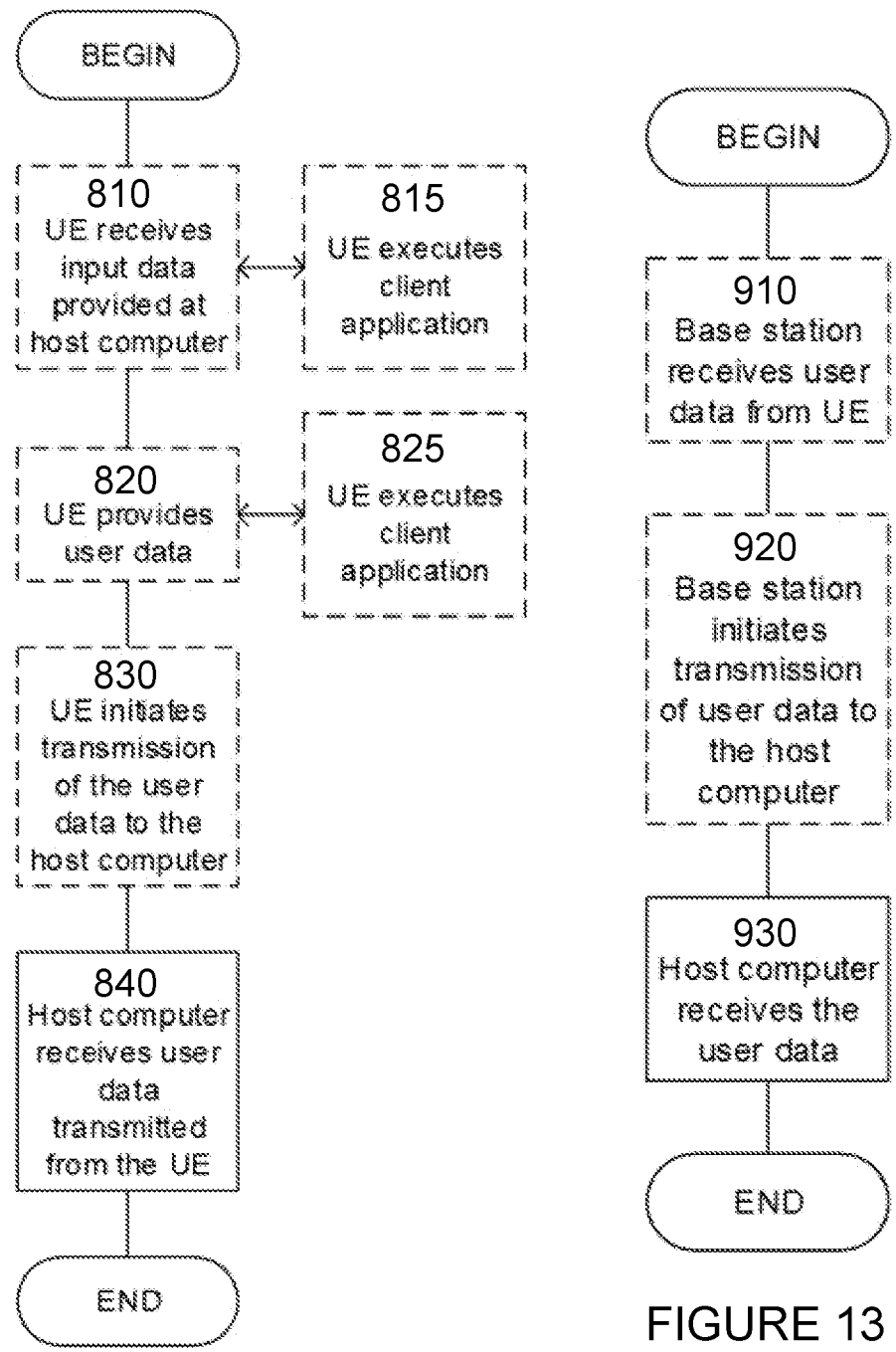
FIG. 12 illustrates a method implemented in a communication system, in accordance with one embodiment.
FIG. 13 illustrates a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
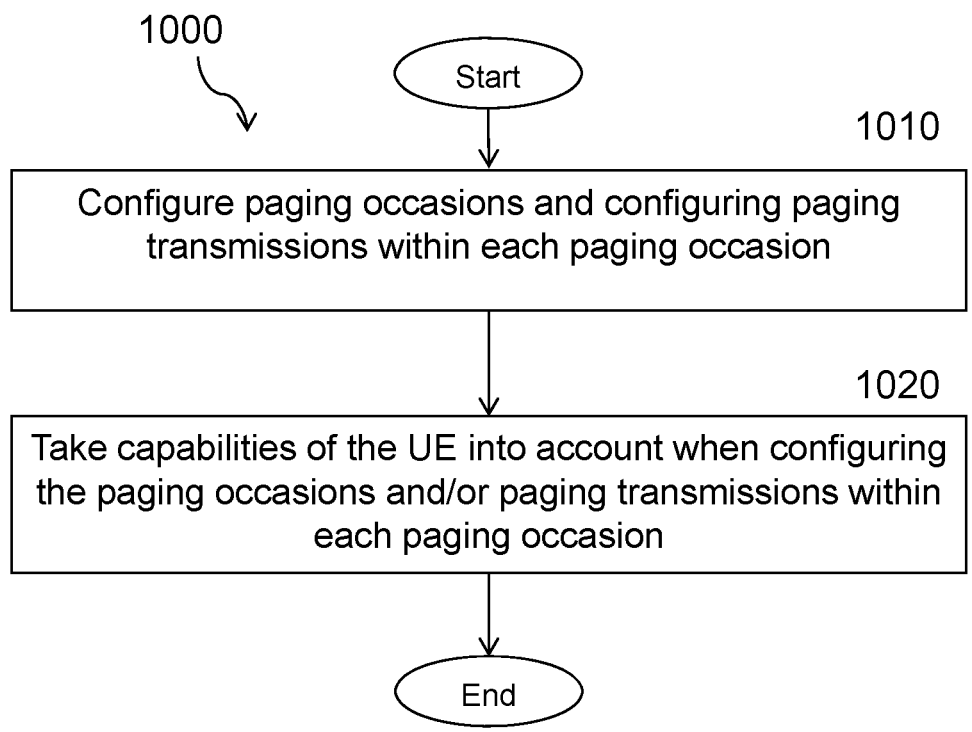
FIG. 14 illustrates an example method for configuring beamformed paging transmission to a UE, according to certain embodiments.

FIG. 14 illustrates an example method 1000 for configuring beamformed paging transmission to a UE, according to certain embodiments. The method begins at step 1010 with the configuring of paging occasions and the configuring of paging transmissions within each paging occasion. The paging transmissions may include multiple beamformed paging transmissions.

At step 1020, the capabilities of the UE are taken into account when configuring the paging occasions and/or paging transmissions within each paging occasion.

Figure 15:
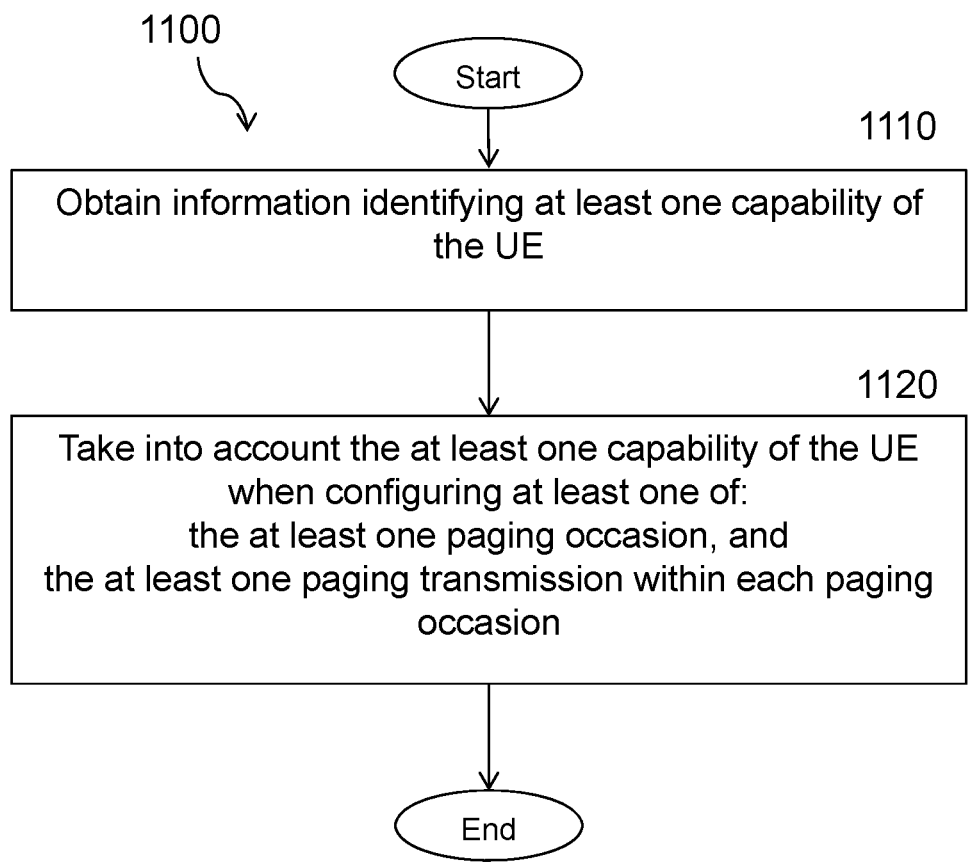
FIG. 15 illustrates an example method by a network node for configuring beamformed paging transmissions to a UE, according to certain embodiments.

FIG. 15 illustrates an example method 1100 by a network node 160 for configuring beamformed paging transmissions to a UE 200. The method begins at step 1110 when the network node 160 obtains information identifying at least one capability of the UE 200. In a particular embodiment, for example, the network node 160 may receive an indication of the at least one capability of the UE 110 from the UE 110.

At step 1120, network node 160 takes into account the at least one capability of the UE when configuring at least one of the at least one paging occasion and the at least one paging transmission within each paging occasion. According to a particular embodiment, the at least one paging transmission comprises at least one paging message.

According to a particular embodiment, configuring the at least one paging occasion and the at least one paging transmission in each paging occasion includes shifting the at least one paging occasion to cover a synchronization signal (SS) Burst Set.

According to a particular embodiment, the at least one paging occasion coincides or overlaps with a SS Burst Set.

According to a particular embodiment, the at least one capability of the UE comprises a maximum reception bandwidth of the UE. In a particular embodiment, for example, the maximum reception bandwidth may be determined based on whether the UE is a NB UE or WB UE.

According to a particular embodiment, when taking the at least one capability of the UE into account, network node 160 may determine where to place the at least one paging occasion in a time domain in relation to at least one SS Block transmission in a SS Burst Set.

For example, in a particular embodiment, network node 160 may determine that a maximum reception bandwidth of the UE is equal to a bandwidth of the SS Block transmissions or exceeds the bandwidth of the SS Block transmissions with a margin that is not sufficient to transmit a paging transmission and place the at least one paging occasion after a last SS Block transmission in the SS Burst Set.

In another example, the at least one paging transmission may be configured to coincide with a SS Block transmission, and the at least one paging transmission may be configured for a first frequency range and the SS Block transmission configured for a second frequency range. The first frequency range may be different from the second frequency range without overlapping with the second frequency range. The at least one capability of the UE may be an ability of the UE to simultaneously receive both a SS Block transmission and the at least one paging transmission.

In still another example embodiment, each of the at least one paging transmissions may be configured to be transmitted between a pair of adjacent SS Block transmissions within a SS Burst Set. For example, a paging transmission may be configured after every second SS Block transmission within the SS Burst Set. Alternatively, a paging transmission may be configured after every fourth SS Block transmission within the SS Burst Set. In still another example embodiment, a paging transmission may be configured after each SS Block transmission in the SS Burst Set.

According to a particular embodiment, the method may also include the network node 160 transmitting resource information to the UE. The resource information includes at least one of timing resources and frequency resources for receiving the at least one paging transmission from the network node.

According to a particular embodiment, the method may also include the network node 160 transmitting, to the UE, the at least one paging transmission.

According to a particular embodiment, a frequency range of the at least one paging transmission at least partially overlaps with a frequency range of each SS Block transmission within the SS Burst Set.

According to a particular embodiment, a bandwidth of the at least one paging transmissions is equal to or smaller than a maximum reception bandwidth of the UE.

According to a particular embodiment, the method may further include network node 160 determining that a maximum reception bandwidth of the UE is equal to a bandwidth of each SS Block transmission in a SS Burst Set or exceeds the bandwidth of each SS Block transmission in a SS Burst Set with a margin that is not sufficient to transmit a paging transmission.

According to a particular embodiment, the at least one paging transmission comprises at least one paging indication, and the at least one paging indication indicates that a paging message can be received using at least one time or frequency resource other than at least one time or frequency resource used for the paging transmission.

Figure 16:
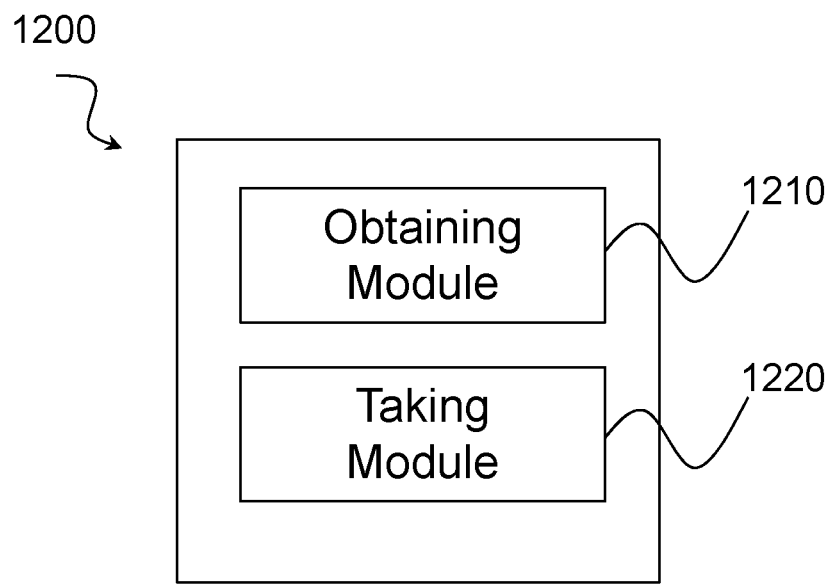
FIG. 16 illustrates an example virtual apparatus in a wireless network, according to certain embodiments.

FIG. 16 illustrates a schematic block diagram of a virtual apparatus 1200 in a wireless network (for example, the wireless network shown in FIG. 1). The apparatus may be implemented in a network node such as, for example, network node 160 shown in FIGS. 1 and 2. Apparatus 1200 is operable to carry out the example method described with reference to FIG. 15 and possibly any other processes or methods disclosed herein. It is also to be understood that the method of FIG. 15 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1210, taking module 1220, and any other suitable units of virtual apparatus 1200 to perform corresponding functions according one or more embodiments of the present disclosure.

According to certain embodiments, obtaining module 1210 may perform certain of the obtaining functions of the virtual apparatus 1200. For example, obtaining module 1210 may obtain information identifying at least one capability of the UE 200.

According to certain embodiments, taking module 1220 may perform certain of the taking functions of the virtual apparatus 1200. For example, taking module 1220 may take into account the at least one capability of the UE when configuring at least one of the at least one paging occasion and the at least one paging transmission within each paging occasion.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
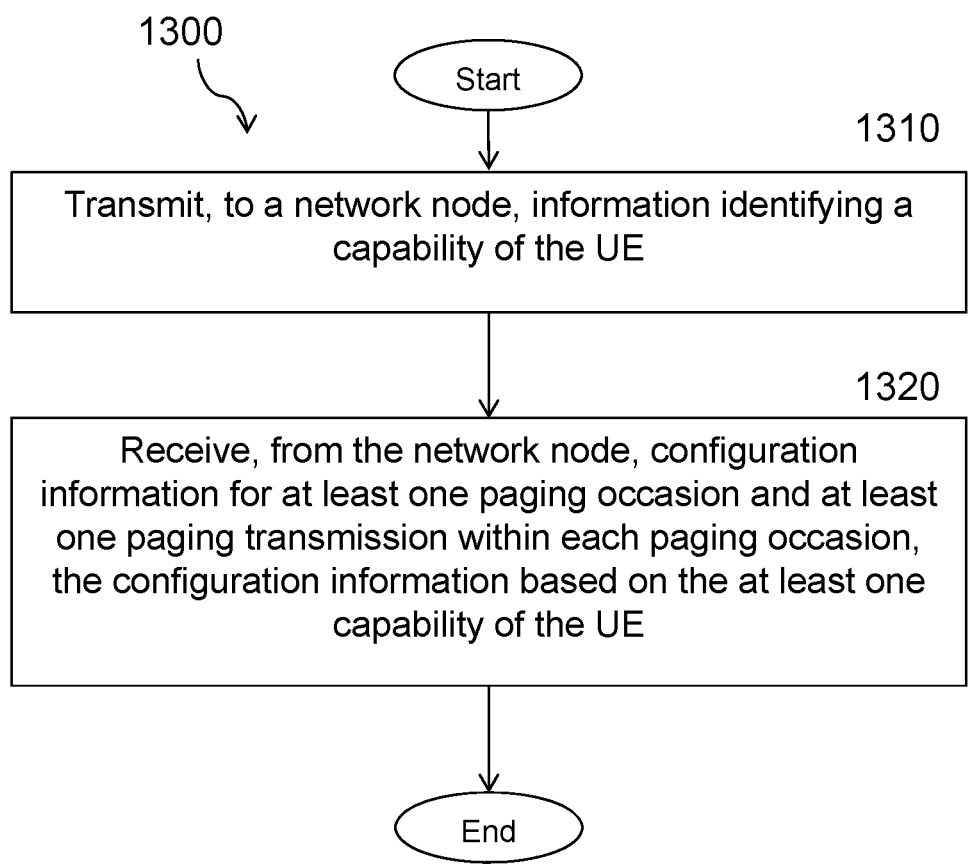
FIG. 17 illustrates an example method by a UE for receiving beamformed paging transmissions, according to certain embodiments.

FIG. 17 illustrates an example method 1300 by a UE for receiving beamformed paging transmissions. The UE may include a UE such as UE 200 or another wireless device 110 as described above.

The method begins at step 1310 when UE 200 transmits, to a network node 160, information identifying a capability of the UE. For example, in a particular embodiment, the at least one capability of the UE comprises a maximum reception bandwidth of the UE.

At step 1320, UE 200 receives, from network node 160, configuration information for at least one paging occasion and at least one paging transmission within each paging occasion. The configuration information is based on the at least one capability of the UE.

In a particular embodiment, the at least one paging transmission comprises at least one paging message.

In another particular embodiment, the at least one paging transmission comprises at least one paging indication that indicates that a paging message can be received using at least one time or frequency resource other than at least one time or frequency resource used for the paging transmission.

In a particular embodiment, the configuration information is resource information that may include at least one of timing resources and frequency resources for receiving the at least one paging transmission from the network node.

In a particular embodiment, the at least one paging occasion is shifted to cover a synchronization signal (SS) Burst Set.

In a particular embodiment, the at least one paging occasion coincides or overlaps with a synchronization signal (SS) Burst Set.

In a particular embodiment, the configuration information indicates a placement of the at least one paging occasion in a time domain in relation to at least one SS Block transmission in a SS Burst Set.

In a particular embodiment, each of the at least one paging transmissions is configured to be to be transmitted between a pair of adjacent SS Block transmissions within a SS Burst Set. For example, a paging transmission may be configured after every second SS Block transmission in a SS Burst Set. In another example, a paging transmission may be configured after every fourth SS Block transmission in a SS Burst Set. In still another example, a paging transmission is configured after each SS Block transmission in the SS Burst Set.

In a particular embodiment, a frequency range of the at least one paging transmission at least partially overlaps with a frequency range of each SS Block transmission within the SS Burst Set.

In a particular embodiment, the method may further include the UE 200 receiving, from network node 160, the at least one paging transmission.

In yet another particular embodiment, the at least one capability of the UE comprises a maximum reception bandwidth of the UE, and the maximum reception bandwidth is equal to a bandwidth of the SS Block transmission or exceeds the bandwidth of the SS Block transmission with a margin that is not sufficient to transmit a paging message. The configuration information indicates that the at least one paging occasion is placed after a last SS Block transmission in the SS Burst Set.

In still another embodiment, the at least one capability of the UE is an ability of the UE to simultaneously receive both a SS Block transmission and the at least one paging transmission. Additionally, the at least one paging transmission is configured to coincide with a SS Block transmission, and the at least one paging transmission is configured for a first frequency range and the SS Block transmission configured for a second frequency range, where the first frequency range is different from the second frequency range.

In still another particular embodiment, a bandwidth of the at least one paging transmission is equal to or smaller than a maximum reception bandwidth of the UE.

In yet another particular embodiment, a maximum reception bandwidth of the UE is equal to a bandwidth of each SS Block transmission in a SS Burst Set or the maximum reception bandwidth of the UE exceeds the bandwidth of each SS Block transmission in a SS Burst Set with a margin that is not sufficient to transmit a paging transmission.

Figure 18:
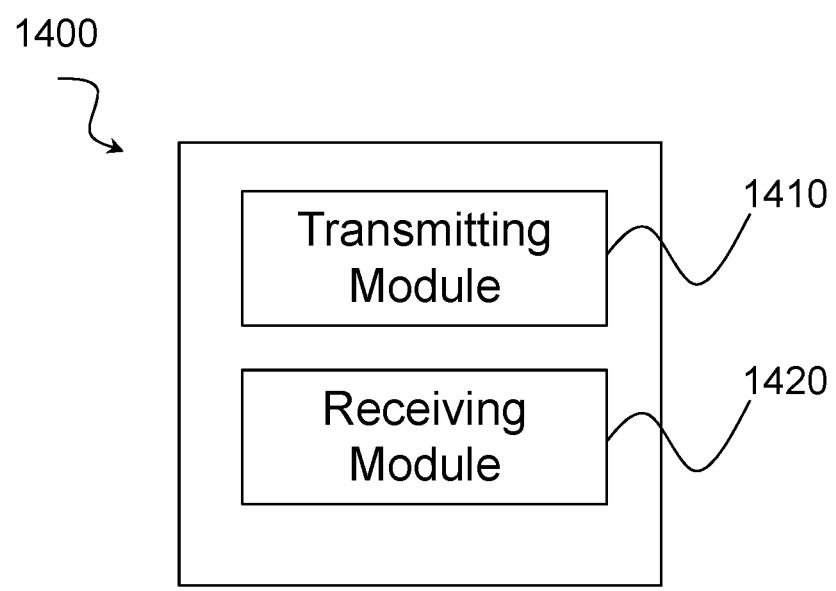
FIG. 18 illustrates another example virtual apparatus in a wireless network, according to certain embodiments.

FIG. 18 illustrates a schematic block diagram of a virtual apparatus 1400 in a wireless network (for example, the wireless network shown in FIG. 1). The apparatus may be implemented in a UE such as, for example, UE 200 shown in FIG. 3 or another wireless device 110 as shown in FIGS. 1 and 2. Apparatus 1400 is operable to carry out the example method described with reference to FIG. 17 and possibly any other processes or methods disclosed herein. It is also to be understood that the method of FIG. 17 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1410, receiving module 1420, and any other suitable units of virtual apparatus 1400 to perform corresponding functions according one or more embodiments of the present disclosure.

According to certain embodiments, transmitting module 1410 may perform certain of the transmitting functions of the virtual apparatus 1400. For example, transmitting module 1410 may transmit, to a network node 160, information identifying a capability of the UE.

According to certain embodiments, receiving module 1420 may perform certain of the receiving functions of the virtual apparatus 1400. For example, receiving module 1420 may receive, from network node 160, configuration information for at least one paging occasion and at least one paging transmission within each paging occasion. The configuration information is based on the at least one capability of the UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

According to certain embodiments, a method for configuring beamformed paging transmissions to a UE comprises the following steps:
configuring paging occasions and configuring [multiple beamformed] paging transmissions within each 1 paging occasion,
taking capabilities of the UE into account when configuring the paging occasions and/or paging transmissions within each paging occasion,
optionally, [at least some] paging occasions coincide [or overlap] with SS Block beam sweeps [forming SS Burst Sets] {This must not exclude that paging occasions may not coincide with SS Block beam sweeps},
optionally, the capabilities of the UE comprise the UE's maximum reception bandwidth [e.g. whether the UE is a narrowband UE or a wideband UE],
optionally, POs are placed differently in the time domain [in relation to SS Block beam sweeps/SS Burst Sets], depending on the capabilities of the UE. {This pseudoclaim aims to support that a PO is moved to right after the SS Burst Set.}
optionally, the PO is placed after the SS Block beam sweep/SS Burst Set, if the UE's maximum reception bandwidth is equal to the bandwidth of the SS Block transmissions or exceeds the bandwidth of the SS Block transmissions with a margin that is not sufficient to transmit a paging message [with the same time length as a SS Block transmission] [i.e. if the UE is a narrowband UE],
optionally, the paging transmissions are configured to coincide with SS Block transmissions, but using different frequencies, if the UE's maximum reception bandwidth is large enough to simultaneously receive both a SS Block transmission and a paging transmission [i.e. if the UE is a wideband UE] {This pseudoclaim aims to support frequency multiplexing of SS Block transmissions and paging transmissions for wideband UEs.},
optionally, [one or more of] the paging transmission(s) is/are configured to be to be transmitted between SS Block transmissions within a SS Block beam sweep/SS Burst Set {This must not exclude that at least one of the paging transmissions is configured not to be transmitted between SS Block transmissions within a SS Block beam sweep/SS Burst Set, but instead after the last SS Block transmission in the SS Block beam sweep/SS Burst Set. Hence the possible insertion of "one or more of" within square brackets.},
optionally, one or more paging transmission(s) is/are configured after every second SS Block transmission in a SS Block beam sweep/SS Burst Set,
optionally, one or more paging transmission(s) is/are configured after every fourth SS Block transmission in a SS Block beam sweep/SS Burst Set {One may note that in principle the embodiment immediately above already covers that one or more paging transmission(s)

is/are configured after every fourth SS Block transmission, but the purpose of this pseudo-claim is of course to cover the alternative where four SS Block transmissions occur in between every group of paging transmissions.}, optionally, one or more paging transmissions is configured after each SS Burst, optionally, the bandwidth of the paging transmissions is configured to be the same as the bandwidth of a SS Block transmissions, optionally, the bandwidth of the paging transmissions is configured to be equal to or smaller than the UE's maximum reception bandwidth, optionally, a paging transmission comprises a paging message, and optionally, a paging transmission comprises a paging indication, indicating that a paging message can be received on other time/frequency resources.

According to certain embodiments, a method performed by a wireless device for configuration of paging transmissions for wideband and narrowband UEs comprises one or more of the steps described above. Optionally, the method further comprises providing user data and forwarding the user data to a host computer via the transmission to the base station.

According to certain embodiments, a method performed by a base station for configuration of paging transmissions for wideband and narrowband UEs comprises one or more of the steps described above. Optionally, the method further comprises obtaining user data and forwarding the user data to a host computer or a wireless device.

According to certain embodiments, a wireless device for configuration of paging transmissions for wideband and narrowband UEs comprises processing circuitry configured to perform any of the steps described above and power supply circuitry configured to supply power to the wireless device.

According to certain embodiments, a base station for configuration of paging transmissions for wideband and narrowband UEs comprises processing circuitry configured to perform any of the steps described above and power supply circuitry configured to supply power to the wireless device.

According to certain embodiments, a user equipment (UE) for configuration of paging transmissions for wideband and narrowband UEs comprises:

an antenna configured to send and receive wireless signals, radio front-end circuitry connected to the antenna and to processing circuitry, and configured to condition signals communicated between the antenna and the processing circuitry, wherein the processing circuitry is configured to perform any of the steps described above, an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

According to certain embodiments, a communication system including a host computer comprises:

processing circuitry configured to provide user data and a communication interface configured to forward the user data to a cellular network for transmission to a user equipment (UE), the cellular network comprises a base station having a radio interface and processing circuitry configured to perform any of the steps described above.

optionally, the communication system further includes the base station, optionally, the communication system further includes the UE and the UE is configured to communicate with the base station, optionally, the processing circuitry of the host computer is configured to execute a host application, thereby providing the user data and the UE comprises processing circuitry configured to execute a client application associated with the host application.

According to certain embodiments, a method implemented in a communication system including a host computer, a base station and a user equipment (UE). The method comprises:

at the host computer, providing user data; and at the host computer, initiating a transmission carrying the user data to the UE via a cellular network comprising the base station, wherein the base station performs any of the steps of any of the Group B embodiments;

optionally, the method further includes, at the base station, transmitting the user data.

optionally, the user data is provided at the host computer by executing a host application, and the method further comprises, at the UE, executing a client application associated with the host application.

optionally, the user equipment (UE), which is configured to communicate with a base station, comprises a radio interface and processing circuitry configured to performs the of the previous 3 embodiments.

According to certain embodiments, a communication system including a host computer comprises:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

optionally, the cellular network further includes a base station configured to communicate with the UE.

optionally, the processing circuitry of the host computer is configured to execute a host application, thereby providing the user data and the UE's processing circuitry is configured to execute a client application associated with the host application.

According to certain embodiments, a method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps described above, optionally, the method further includes, at the UE, receiving the user data from the base station, optionally, the method further includes at the UE, receiving the user data from the base station, According to certain embodiments, a communication system including a host computer comprises:

communication interface configured to receive user data originating from a transmission from a user equipment (UE) to a base station, wherein the UE comprises a radio interface and processing circuitry, the UE's processing circuitry configured to perform any of the steps described above, optionally, the communication system, further includes the UE.

optionally, the communication system, further includes the base station, wherein the base station comprises a radio interface configured to communicate with the UE and a communication interface configured to forward to the host computer the user data carried by a transmission from the UE to the base station, optionally, the processing circuitry of the host computer is configured to execute a host application, and the UE's processing circuitry is configured to execute a client application associated with the host application, thereby providing the user data, optionally, the processing circuitry of the host computer is configured to execute a host application, thereby providing request data and the UE's processing circuitry is configured to execute a client application associated with the host application, thereby providing the user data in response to the request data.

A method implemented in a communication system including a host computer, a base station and a user equipment (UE), the method comprising:

at the host computer, receiving user data transmitted to the base station from the UE, wherein the UE performs any the above described steps, optionally, the method further comprises, at the UE, providing the user data to the base station, optionally, the method further comprises at the UE, executing a client application, thereby providing the user data to be transmitted and at the host computer, executing a host application associated with the client application, optionally, the method further comprises at the UE, executing a client application and at the UE, receiving input data to the client application, the input data being provided at the host computer by executing a host application associated with the client application, wherein the user data to be transmitted is provided by the client application in response to the input data.

A communication system including a host computer comprising:

a communication interface configured to receive user data originating from a transmission from a user equipment (UE) to a base station, wherein the base station comprises a radio interface and processing circuitry, the base station's processing circuitry configured to perform any of the steps described above, optionally, further including the base station, optionally, further including the UE, wherein the UE is configured to communicate with the base station, optionally, the processing circuitry of the host computer is configured to execute a host application and the UE is configured to execute a client application associated with the host application, thereby providing the user data to be received by the host computer.

According to certain embodiments, a method implemented in a communication system including a host computer, a base station and a user equipment (UE), the method comprising:

at the host computer, receiving, from the base station, user data originating from a transmission which the base station has received from the UE, wherein the UE performs any of the steps described above, optionally, the method further comprising at the base station, receiving the user data from the UE, optionally, the method further comprising, at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CRS Cell-specific Reference Signal
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
EPS Evolved Packet System
ePDCCH enhanced Physical Downlink Control Channel
E-SMLC evolved Serving Mobile Location Center
ETWS Earthquake and Tsunami Warning System
E-UTRA Evolved UTRA
E-UTRAN Evolved UTRAN
FDD Frequency Division Duplex
FFS For Further Study
GERAN GSM EDGE Radio Access Network
gNB Base station in NR or the term for a radio base station in NR (corresponding to eNB in LTE).
GNSS Global Navigation Satellite System
GSM Global System for Mobile communication
HARQ Hybrid Automatic Repeat Request
HO Handover
HSPA High Speed Packet Access
HRPD High Rate Packet Data
IMSI International Mobile Subscriber Identity
IoT Internet of Things LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NB Narrowband
NR New Radio (The term used for the 5G radio interface and radio access network in the technical reports and standard specifications 3GPP are working on.)
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PO Paging Occasion
PRACH Physical Random Access Channel
PRS Positioning Reference Signal
P-RNTI Paging RNTI
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network or Random Access Network
RAT Radio Access Technology
RLM Radio Link Management
RNA RAN Notification Area
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN Single Frequency Network
SGW Serving Gateway
S1 The interface between the RAN and the core network in EPS/LTE.
S1AP S1 Application Protocol (The control plane protocol between the RAN and the core network in EPS/LTE.)
SAE System Architecture Evolution
SCS Subcarrier Spacing
SI System Information
SIB System Information Block
SNR Signal to Noise Ratio
SON Self Optimized Network
SS Synchronization Signal
SSB SS Block
SSS Secondary Synchronization Signal
S-TMSI SAE-TMSI
TMSI Temporary Mobile Subscriber Identity
TDD Time Division Duplex
TDOA Time Difference of Arrival
TOA Time of Arrival
TRP Transmission/Reception Point
TSS Tertiary Synchronization Signal
TTI Transmission Time Interval
TX Transmission/Transmit
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WB Wideband
WCDMA Wide CDMA
WLAN Wide Local Area Network

The invention claimed is:

1. A method performed by a network node for configuring beamformed paging transmissions to a user equipment (UE), wherein the method comprises:
 obtaining information identifying at least one capability of the UE;
 taking into account the at least one capability of the UE when configuring:
  at least one paging occasion, and
  at least one paging transmission within each paging occasion, wherein the at least one paging transmission is configured to be transmitted time multiplexed with synchronization signal (SS) block transmissions for a narrowband capable UE and frequency multiplexed with SS block transmissions for a wideband capable UE; and
 transmitting a first paging transmission wherein:
  upon transmitting to a narrowband capable UE, the first paging transmission is time multiplexed with the SS block transmissions; and
  upon transmitting to a wideband capable UE, the first paging transmission is frequency multiplexed with SS block transmissions.

2. The method of claim 1, further comprising:
 transmitting resource information to the UE, the resource information comprising at least one of timing resources and frequency resources for receiving the at least one paging transmission from the network node.

3. The method of claim 1, wherein configuring the at least one paging occasion and the at least one paging transmission in each paging occasion comprises:
 shifting the at least one paging occasion to coincide or overlap with a synchronization signal (SS) Burst Set.

4. The method of claim 1, wherein the at least one paging occasion coincides or overlaps with a synchronization signal (SS) Burst Set.

5. The method of claim 1, wherein the at least one capability of the UE comprises a maximum reception bandwidth of the UE.

6. The method of claim 1, wherein taking the at least one capability of the UE into account comprises:
determining where to place the at least one paging occasion in a time domain in relation to at least one SS Block transmission in a SS Burst Set.

7. The method of claim 6, further comprising:
determining that a maximum reception bandwidth of the UE is equal to a bandwidth of the SS Block transmission or exceeds the bandwidth of the SS Block transmissions with a margin that is not sufficient to transmit a paging transmission; and
placing the at least one paging occasion after a last SS Block transmission in the SS Burst Set.

8. The method of claim 1, wherein:
the at least one paging transmission is configured to coincide with a SS Block transmission, the at least one paging transmission configured for a first frequency range and the SS Block transmission configured for a second frequency range, the first frequency range being different from the second frequency range without overlapping with the second frequency range, and
the at least one capability of the UE is an ability of the UE to simultaneously receive both a SS Block transmission and the at least one paging transmission.

9. The method of claim 1, wherein each of the at least one paging transmissions is configured to be to be transmitted between a pair of adjacent SS Block transmissions within a SS Burst Set.

10. The method of claim 9, wherein a paging transmission is configured according one of the following:
after every second SS Block transmission in a SS Burst Set;
after every fourth SS Block transmission in a SS Burst Set; or
after each SS Block transmission in the SS Burst set.

11. The method of claim 9, wherein a frequency range of the at least one paging transmission at least partially overlaps with a frequency range of each SS Block transmission within the SS Burst set.

12. The method of claim 9, wherein a bandwidth of the at least one paging transmission is equal to or smaller than a maximum reception bandwidth of the UE.

13. The method of claim 9, further comprising:
determining that a maximum reception bandwidth of the UE is equal to a bandwidth of each SS Block transmission in a SS Burst Set or exceeds the bandwidth of each SS Block transmission in a SS Burst Set with a margin that is not sufficient to transmit a paging transmission.

14. The method of claim 1, wherein the at least one paging transmission comprises at least one paging indication, the at least one paging indication indicating that a paging message can be received using at least one time or frequency resource other than at least one time or frequency resource used for the paging transmission.

15. A network node for configuring beamformed paging transmissions to a user equipment (UE), wherein the network node comprising:
processing circuitry configured to:
obtain information identifying at least one capability of the UE; and
take capabilities into account the at least one capability of the UE into account when configuring:
at least one paging occasions, and/or
at least one paging transmissions within each paging occasion, wherein the at least one paging transmission is configured to be transmitted time multiplexed with synchronization signal (SS) block transmissions for a narrowband capable UE and frequency multiplexed with SS block transmissions for a wideband capable UE; and
transmit a first paging transmission wherein:
upon transmitting to a narrowband capable UE, the first paging transmission is time multiplexed with the SS block transmissions; and
upon transmitting to a wideband capable UE, the first paging transmission is frequency multiplexed with SS block transmissions.

16. The network node of claim 15, wherein the processing circuitry is configured to:
transmit resource information to the UE, the resource information comprising at least one of timing resources and frequency resources for receiving the at least one paging transmission from the network node.

17. The network node of claim 15, wherein configuring the at least one paging occasion and the at least one paging transmission in each paging occasion comprises:
shifting the at least one paging occasion to cover a synchronization signal (SS) Burst Set.

18. The network node of claim 15, wherein the at least one paging occasion coincides or overlaps with a synchronization signal (SS) Block Burst Set.

19. The network node of claim 15, wherein the at least one capability of the UE comprises a maximum reception bandwidth of the UE.

20. The network node of claim 15, wherein when taking the at least one capability of the UE into account the processing circuitry is configured to determine where to place the at least one paging occasion in a time domain in relation to at least one SS Block transmission in a SS Burst Set.

21. The network node of claim 20, wherein the processing circuitry is configured to:
determine that a maximum reception bandwidth of the UE is equal to a bandwidth of the SS Block transmission or exceeds the bandwidth of the SS Block transmissions with a margin that is not sufficient to transmit a paging transmission; and
place the at least one paging occasion after a last SS Block transmission in the SS Burst Set.

22. The network node of claim 15, wherein:
the at least one paging transmission is configured to coincide with a SS Block transmission, the at least one paging transmission configured for a first frequency range and the SS Block transmission configured for a second frequency range, the first frequency range being different from the second frequency range without overlapping with the second frequency range, and
the at least one capability of the UE is an ability of the UE to simultaneously receive both a SS Block transmission and the at least one paging transmission.

23. The network node of claim 15, wherein each of the at least one paging transmissions is configured to be to be transmitted between a pair of adjacent SS Block transmissions within a SS Burst Set.

24. The network node of claim 23, wherein a paging transmission is configured according to one of the following:
after every second SS Block transmission in a SS Burst Set;

after every fourth SS Block transmission in a SS Burst Set; or after each SS Block transmission in the SS Burst Set.

25. The network node of claim 23, wherein a frequency range of the at least one paging transmission at least partially overlaps with a frequency range of each SS Block transmission within the SS Burst Set.

26. The network node of claim 23, wherein a bandwidth of the at least one paging transmission is equal to or smaller than a maximum reception bandwidth of the UE.

27. The network node of claim 23, wherein the processing circuitry is configured to:
   determine that a maximum reception bandwidth of the UE is equal to a bandwidth of each SS Block transmission in a SS Burst Set or exceeds the bandwidth of each SS Block transmission in a SS Burst Set with a margin that is not sufficient to transmit a paging transmission.

28. The network node of claim 15, wherein the at least one paging transmission comprises at least one paging indication, the at least one paging indication indicating that a paging message can be received using at least one time or frequency resource other than at least one time or frequency resource used for the paging transmission.

29. A method by a UE for receiving beamformed paging transmissions, wherein the method comprises:
   transmitting, to a network node, information identifying a capability of the UE; and
   receiving, from the network node, configuration information for at least one paging occasion and at least one paging transmission within each paging occasion, the configuration information based on the at least one capability of the UE, wherein the at least one paging transmission is configured to be transmitted time multiplexed with synchronization signal (SS) block transmissions for a narrowband capable UE and frequency multiplexed with SS block transmissions for a wideband capable UE; and
   receiving a first paging transmission wherein:
      upon the UE being a narrowband capable UE, the first paging transmission is time multiplexed with the SS block transmissions; and
      upon the UE being a wideband capable UE, the first paging transmission is frequency multiplexed with SS block transmissions.

30. A user equipment (UE) for receiving beamformed paging transmissions, wherein the UE comprising:
   processing circuitry configured to:
      transmit, to a network node, information identifying a capability of the UE; and
      receive, from the network node, configuration information for at least one paging occasion and at least one paging transmission within each paging occasion, the configuration information based on the at least one capability of the UE
   wherein the at least one paging transmission is configured to be transmitted time multiplexed with synchronization signal (SS) block transmissions for a narrowband capable UE and frequency multiplexed with SS block transmissions for a wideband capable UE; and
   receive a first paging transmission wherein:
      upon the UE being a narrowband capable UE, the first paging transmission is time multiplexed with the SS block transmissions; and
      upon the UE being a wideband capable UE, the first paging transmission is frequency multiplexed with SS block transmissions.

* * * * *